(12) United States Patent
Elizarov et al.

(10) Patent No.: US 8,725,491 B2
(45) Date of Patent: *May 13, 2014

(54) MOBILE ELECTRONIC DEVICE AND ASSOCIATED METHOD ENABLING IDENTIFICATION OF PREVIOUSLY ENTERED DATA FOR TRANSLITERATION OF AN INPUT

(71) Applicant: Research In Motion Limited, Waterloo (CA)

(72) Inventors: Michael Elizarov, Waterloo (CA); Xin Wang, Waterloo (CA); Xiaoting Sun, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/890,784

(22) Filed: May 9, 2013

(65) Prior Publication Data

US 2013/0253905 A1 Sep. 26, 2013

Related U.S. Application Data

(63) Continuation of application No. 12/395,012, filed on Feb. 27, 2009, now Pat. No. 8,463,597.

(60) Provisional application No. 61/052,223, filed on May 11, 2008.

(51) Int. Cl.
*G06F 17/20* (2006.01)

(52) U.S. Cl.
USPC ............... 704/8; 704/1; 704/2; 704/3; 704/4; 704/5; 704/6; 704/7; 704/9; 704/10; 704/270; 704/272; 704/277

(58) Field of Classification Search
USPC .............................................. 704/8
See application file for complete search history.

(56) References Cited

U.S. PATENT DOCUMENTS 5,212,638 A 5/1993 Bernath
5,425,110 A * 6/1995 Spitz ........................ 382/192
(Continued)

FOREIGN PATENT DOCUMENTS

KR 10-2006-0056591 5/2006
WO 94/25922 A1 11/1994
(Continued)

OTHER PUBLICATIONS

Office Action for Application No. 200980100327.3, from the State Intellectual Property Office of People's Republic of China, dated Sep. 6, 2013.

*Primary Examiner* — Pierre-Louis Desir
*Assistant Examiner* — Fariba Sirjani
(74) *Attorney, Agent, or Firm* — Finnegan, Henderson, Farabow, Garrett & Dunner LLP

(57) ABSTRACT

An improved mobile electronic device and associated method enable the identification of previously-entered textual objects in one or more custom wordlists to identify possible transliterations of textual inputs. Such textual objects can be stored as data in a Pinyin custom wordlist if it is in the nature of Standard Mandarin characters or it can be stored in a BoPoMoFo custom wordlist if it is in the nature of Traditional Chinese characters, or it can be stored in both if it is in the nature of both Standard Mandarin characters and Traditional Chinese characters.

12 Claims, 9 Drawing Sheets

(56) References Cited

U.S. PATENT DOCUMENTS

| | | | |
|---|---|---|---|
| 5,432,948 A | 7/1995 | Davis et al. | |
| 6,005,498 A | 12/1999 | Yang et al. | |
| 6,014,615 A * | 1/2000 | Chen | 704/3 |
| 6,073,146 A | 6/2000 | Chen | |
| 6,101,461 A | 8/2000 | Ukigawa et al. | |
| 6,421,680 B1 * | 7/2002 | Kumhyr et al. | 1/1 |
| 6,460,015 B1 * | 10/2002 | Hetherington et al. | 704/8 |
| 6,580,917 B1 * | 6/2003 | Lefevre et al. | 455/466 |
| 6,646,573 B1 | 11/2003 | Kushler et al. | |
| 6,686,852 B1 | 2/2004 | Guo | |
| 6,801,659 B1 | 10/2004 | O'Dell | |
| 6,822,585 B1 | 11/2004 | Ni et al. | |
| 7,099,876 B1 | 8/2006 | Hetherington et al. | |
| 7,177,794 B2 * | 2/2007 | Mani et al. | 704/8 |
| 7,245,943 B2 | 7/2007 | Ryu | |
| 7,310,605 B2 * | 12/2007 | Janakiraman et al. | 704/277 |
| 7,366,984 B2 | 4/2008 | Robbins et al. | |
| 7,369,986 B2 | 5/2008 | Janakiraman et al. | |
| 7,486,277 B2 | 2/2009 | Kong | |
| 7,512,533 B2 | 3/2009 | Fux et al. | |
| 7,634,463 B1 | 12/2009 | Katragadda et al. | |
| 7,853,444 B2 * | 12/2010 | Wang et al. | 704/2 |
| 8,028,230 B2 | 9/2011 | Hong | |
| 8,036,878 B2 | 10/2011 | Assadollahi | |
| 8,275,601 B2 * | 9/2012 | Wang et al. | 704/2 |
| 8,438,008 B2 * | 5/2013 | Awaida et al. | 704/8 |
| 8,463,597 B2 * | 6/2013 | Elizarov et al. | 704/10 |
| 8,510,095 B2 * | 8/2013 | Wang et al. | 704/2 |
| 2003/0117375 A1 | 6/2003 | Suda | |
| 2003/0135359 A1 | 7/2003 | Wah Low et al. | |
| 2005/0057512 A1 | 3/2005 | Du et al. | |
| 2005/0086590 A1 * | 4/2005 | Lee et al. | 715/505 |
| 2006/0048055 A1 | 3/2006 | Wu et al. | |
| 2006/0089928 A1 | 4/2006 | Johnson | |
| 2006/0242576 A1 | 10/2006 | Nagel et al. | |
| 2007/0124132 A1 | 5/2007 | Takeuchi | |
| 2007/0242071 A1 | 10/2007 | Harding | |
| 2007/0288229 A1 | 12/2007 | Liu | |
| 2008/0154576 A1 | 6/2008 | Wu et al. | |
| 2008/0221866 A1 | 9/2008 | Katragadda et al. | |
| 2008/0270111 A1 | 10/2008 | Hanumanthappa | |
| 2009/0144049 A1 * | 6/2009 | Haddad et al. | 704/3 |
| 2009/0281787 A1 * | 11/2009 | Wang et al. | 704/2 |
| 2009/0281788 A1 * | 11/2009 | Elizarov et al. | 704/3 |
| 2009/0299727 A1 * | 12/2009 | Fux et al. | 704/4 |
| 2009/0319257 A1 | 12/2009 | Blume et al. | |
| 2010/0131900 A1 | 5/2010 | Spetalnick | |
| 2010/0169361 A1 | 7/2010 | Chen et al. | |
| 2012/0290286 A1 * | 11/2012 | Davtchev et al. | 704/3 |
| 2012/0323555 A1 * | 12/2012 | Wang et al. | 704/2 |

FOREIGN PATENT DOCUMENTS

| | | |
|---|---|---|
| WO | 00/79371 A1 | 12/2000 |
| WO | 2006/024147 A1 | 3/2006 |
| WO | 2008/109769 A1 | 9/2008 |

* cited by examiner

MOBILE ELECTRONIC DEVICE AND ASSOCIATED METHOD ENABLING IDENTIFICATION OF PREVIOUSLY ENTERED DATA FOR TRANSLITERATION OF AN INPUT

CROSS-REFERENCE TO RELATED APPLICATION

The instant application claims priority from U.S. patent application Ser. No. 12/395,012, filed Feb. 27, 2009, which claims priority from U.S. Provisional Patent Application Ser. No. 61/052,223 filed May 11, 2008, the disclosure of which is incorporated herein by reference.

BACKGROUND

1. Field

Example embodiments disclosed herein relate generally to mobile electronic devices and, more particularly, to a mobile electronic device and method that enable the identification of previously entered textual objects during transliteration of an input.

2. Background Information

Numerous types of mobile electronic devices are known. Examples of such mobile electronic devices include, for instance, personal data assistants (PDAs), handheld computers, two-way pagers, cellular telephones, and the like. Many mobile electronic devices also feature wireless communication capability, although many such mobile electronic devices are stand-alone devices that are functional without communication with other devices.

In certain circumstances, a mobile electronic device having a keyboard of Latin letters can be employed to phonetically enter text in languages that are not based upon Latin letters. For instance, Pinyin Chinese is a type of phonetic Chinese "alphabet" which enables transcription between Latin text and Standard Mandarin text. Pinyin Chinese can thus enable the input of Standard Mandarin characters by entering Latin letters. A "pin" is a phonetic sound, oftentimes formed from a plurality of Latin letters, and each pin is associated with one or more Standard Mandarin characters. More than four hundred pins exist, and each pin typically corresponds with a plurality of different Standard Mandarin characters.

It is also understood that BoPoMoFo characters are of a phonetic nature and can be typed on a keyboard to enable the inputting of Traditional Chinese characters. As is generally understood, a Traditional Chinese character is translated from a BoPoMoFo string comprising at most three BoPoMoFo characters and an optional tone.

Both Standard Mandarin, i.e., simplified Chinese, and Traditional Chinese can be said to employ Chinese characters. Some of the characters are Standard Mandarin characters, and others are Traditional Chinese characters, while other characters are common between Standard Mandarin and Traditional Chinese.

While mobile electronic devices that provide transliteration between phonetic input and Chinese texts have been generally effective for their intended purpose, it would be desired to provide an improved method and mobile electronic device that provides improved inputting of text.

SUMMARY

According to a first aspect of the present disclosure, there is provided a method of enabling text input on a mobile electronic device, the method comprising: detecting an initial input of a textual object comprising a number of characters, each character being of a first character type, of a second character type, or of both the first and the second character types; storing, if it is determined that the characters are of the first character type, a first representation of the textual object from the initial input as a new entry in a first data source; storing, if it is determined that the characters are of the second character type, a second representation of the textual object from the initial input as a new entry in a second data source different from the first data source; storing, if it is determined that the characters are of both the first and the second character types, the first representation of the textual object in the first data source as a new entry and the second representation of the textual object in the second data source as a new entry; detecting a textual input in one of a first alphabet that can be transliterated into characters of at least the first character type and a second alphabet that can be transliterated into characters of at least the second character type; and outputting an identified first or second representation of the textual object as a proposed transliteration of the textual input.

According to a second aspect of the present disclosure, there is provided a mobile electronic device comprising: a processor apparatus comprising a processor and a memory; an input apparatus structured to provide input to the processor apparatus; an output apparatus structured to receive output signals from the processor apparatus; and the memory having stored therein a number of routines which, when executed on the processor, cause the mobile electronic device to perform operations comprising: detecting an initial input of a textual object comprising a number of characters, each character being of a first character type, of a second character type, or of both the first and the second character types; storing, if it is determined that the characters are of the first character type, a first representation of the textual object from the initial input as a new entry in a first data source; storing, if it is determined that the characters are of the second character type, a second representation of the textual object from the initial input as a new entry in a second data source different from the first data source; storing, if it is determined that the characters are of both the first and the second character types, the first representation of the textual object in the first data source as a new entry and the second representation of the textual object in the second data source as a new entry; detecting a textual input in one of a first alphabet that can be transliterated into characters of at least the first character type and a second alphabet that can be transliterated into characters of at least the second character type; and outputting an identified first or second representation of the textual object as a proposed transliteration of the textual input.

According to a third aspect of the present disclosure, there is provided a non-transitory machine-readable storage medium comprising instructions which, when executed on a mobile electronic device, cause the mobile electronic device to perform operations comprising: detecting an initial input of a textual object comprising a number of characters, each character being of a first character type, of a second character type, or of both the first and the second character types; storing, if it is determined that the characters are of the first character type, a first representation of the textual object from the initial input as a new entry in a first data source; storing, if it is determined that the characters are of the second character type, a second representation of the textual object from the initial input as a new entry in a second data source different from the first data source; storing, if it is determined that the characters are of both the first and second character types, the first representation of the textual object in the first data source as a new entry and the second representation of the textual object in the second data source as a new entry; detecting a textual input in one of a first alphabet that can be transliterated into characters of at least the first character type and a second alphabet that can be transliterated into characters of at least the second character type; and outputting an identified first or second representation of the textual object as a proposed transliteration of the textual input.

BRIEF DESCRIPTION OF THE DRAWINGS

A full understanding of the disclosed and claimed concept can be gained from the following Description when read in conjunction with the accompanying drawings in which:

Similar numerals refer to similar parts throughout the specification.

DESCRIPTION

Figure 1:
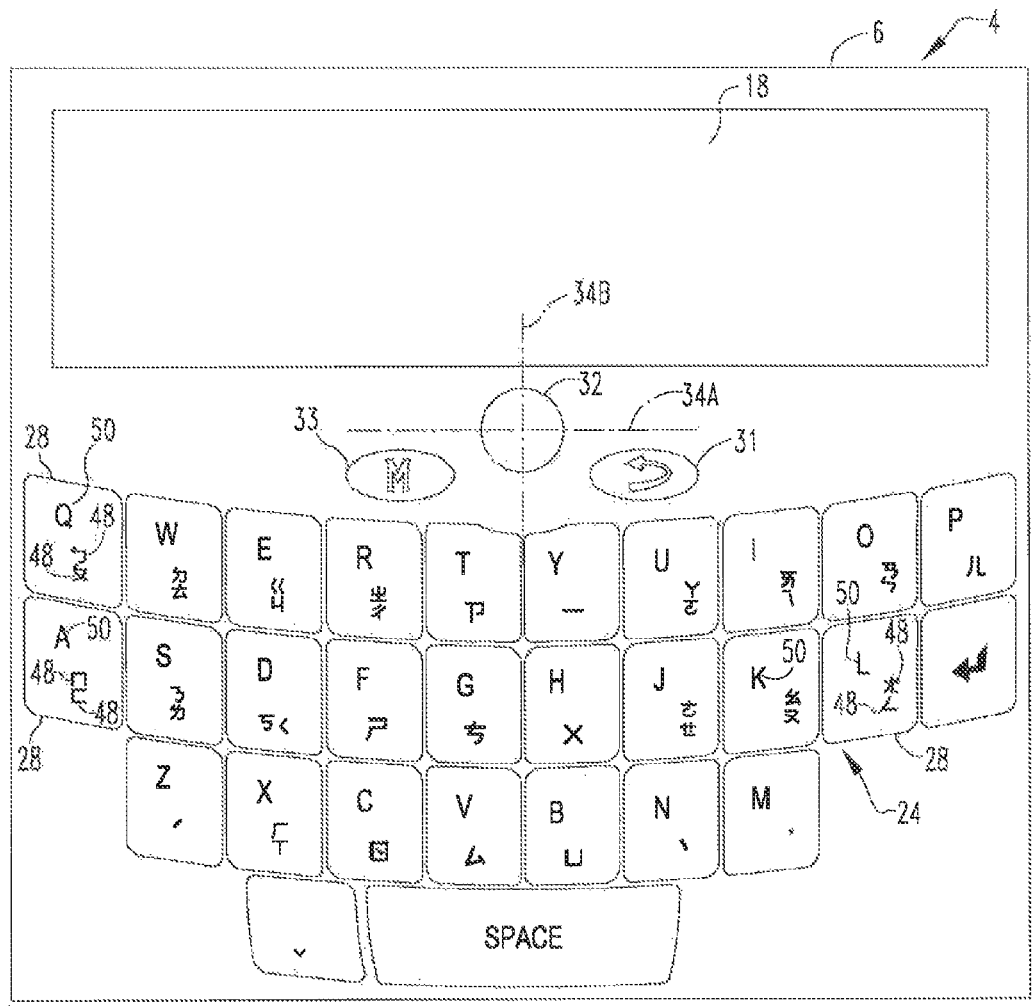
FIG. 1 is a top plan view of an improved mobile electronic device, according to an example embodiment.
Figure 2:
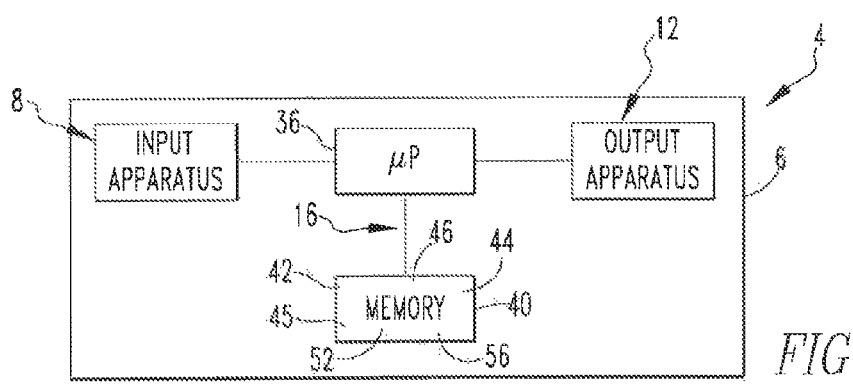
FIG. 2 is a schematic depiction of the improved mobile electronic device of FIG. 1, according to an example embodiment.

An improved mobile electronic device 4 is indicated generally in FIG. 1 and is depicted schematically in FIG. 2. The example embodiment mobile electronic device 4 includes a housing 6 upon which are disposed an input apparatus 8, an output apparatus 12, and a processor apparatus 16. The input apparatus 8 is structured to provide input to the processor apparatus 16, and the output apparatus 12 is structured to receive output signals from the processor apparatus 16. The output apparatus 12 comprises a display 18 that is structured to provide visual output, although other output devices such as speakers, LEDs, tactile output devices, and so forth can be additionally or alternatively used.

As can be seen in FIG. 2, the processor apparatus 16 comprises a processor 36 and a memory 40. The processor 36 may be, for instance and without limitation, a microprocessor (µP) that is responsive to inputs from the input apparatus 8 and that provides output signals to the output apparatus 12. The processor 36 interfaces with the memory 40.

The memory 40 can be said to constitute a machine-readable medium and can be any one or more of a variety of types of internal and/or external storage media such as, without limitation, RAM, ROM, EPROM(s), EEPROM(s), FLASH, and the like that provide a storage register for data storage such as in the fashion of an internal storage area of a computer, and can be volatile memory or nonvolatile memory. The memory 40 has stored therein a number of routines 44 which are executable on the processor 36. As employed herein, the expression "a number of" and variations thereof shall refer broadly to any non-zero quantity, including a quantity of one. The routines 44 can be in any of a variety of forms such as, without limitation, software, firmware, and the like. As will be explained in greater detail below, the routines 44 include a text transliteration routine 44, as well as other routines. The transliteration routine 44 is employable to enable phonetic text input by converting Latin, i.e., pinyin, inputs into Standard Mandarin word output. The transliteration routine 44 is also employable to enable phonetic text input by converting BoPoMoFo inputs from the keyboard 24 into Traditional Chinese word output. The memory 40 also has stored therein a dictionary 42, a character table 45, and other data sources such as a pinyin custom word list 52 and a BoPoMoFo custom word list 56 that are used by the transliteration routine 44 to provide responses to text inputs. The memory 40 also has stored therein an additional data source in the exemplary form of an address book 46.

It is noted that the Chinese language is used as an example embodiment language herein, and it is further understood that other languages such as Japanese and Korean, for example, could similarly be phonetically input on the mobile electronic device in other example embodiments. That is, the mobile electronic device 4 is described herein in an example fashion as being configured for the phonetic inputting of the Chinese language via transliteration between Latin letters and Chinese characters or between BoPoMoFo characters and Chinese characters or both, and it is understood that in other example embodiments the mobile electronic device could be configured to input, for instance, Japanese or Korean text or text in another language.

As can be understood from FIG. 1, the input apparatus 8 includes a keyboard 24 and a multiple-axis input device which, in the example embodiment depicted herein, is a track ball 32 that will be described in greater detail below. The keyboard 24 comprises a plurality of keys 28. Some of the keys 28 each have a Latin character 50 assigned thereto, and some keys 28 have a BoPoMoFo character 48 assigned thereto, and some have both. The Latin characters 50 are arranged in the example embodiments form of a QWERTY keyboard. The keys 28 and the track ball 32 all serve as input elements that are actuatable to provide input to the processor apparatus 16. The keyboard 24 and the track ball 32 are disposed adjacent one another on a front face of the housing 6. This enables a user to operate the track ball 32 substantially without moving the user's hands away from the keyboard 24 during a text entry operation or other operation.

Figure 6:
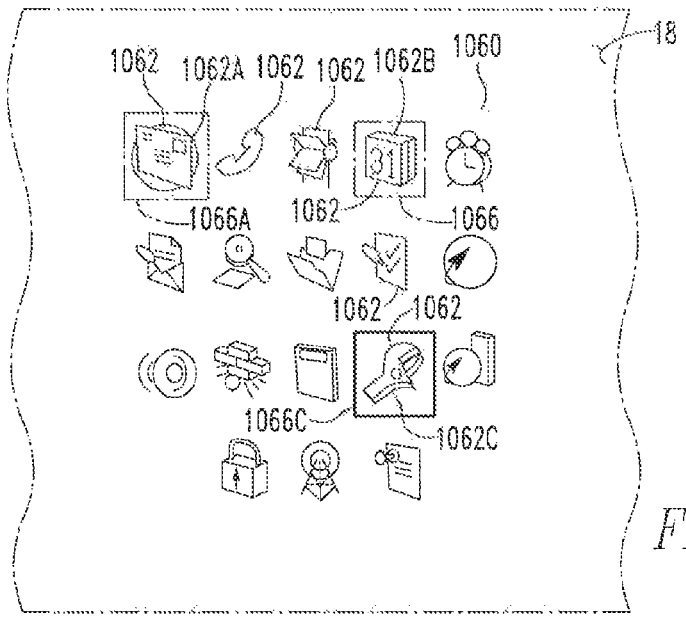
FIG. 6 is a home screen that can be visually output on the mobile electronic device, according to an example embodiment.

One of the keys 28 is an <ESCAPE> key 31 which, when actuated, provides to the processor apparatus 16 an input that undoes the action which resulted from the immediately preceding input and/or moves the user to a logically higher position within a logical menu tree managed by a graphical user interface (GUI) routine 44. The function provided by the <ESCAPE> key 31 can be used at any logical location within any portion of the logical menu tree except, perhaps, at a home screen such as is depicted in FIG. 6. The <ESCAPE> key 31 is disposed adjacent the track ball 32 thereby enabling, for example, an unintended or incorrect input from the track ball 32 to be quickly undone, i.e., reversed, by an actuation of the adjacent <ESCAPE> key 31.

Figure 7:
FIG. 7 depicts a menu that can be output on the mobile electronic device of FIG. 1, according to an example embodiment.

Another of the keys 28 is a <MENU> key 33 which, when actuated, provides to the processor apparatus 16 an input that causes the GUI 44 to generate and output on the display 18 a menu such as is depicted in FIG. 7. Such a menu is appropriate to the user's current logical location within the logical menu tree, as will be described in greater detail below, it is noted that menus and other subject matter that is not directly related to the transliteration routine 44 is depicted in an example fashion herein in the English language, although this is not intended to be limiting.

While in the depicted example embodiment the multiple-axis input device is the track ball 32, it is noted that multiple-axis input devices other than the track ball 32 can be employed in other example embodiments. For instance, other appropriate multiple-axis input devices could include mechanical devices such as joysticks and the like and/or non-mechanical devices such as touch pads, track pads and the like and/or other devices which detect motion or input in other fashions, such as through the use of optical sensors or piezoelectric crystals.

The track ball 32 is freely rotatable in all directions with respect to the housing 6. A rotation of the track ball 32 a predetermined rotational distance with respect to the housing 6 provides an input to the processor apparatus 16, and such inputs can be employed by the routines 44, for example, as navigational inputs, scrolling inputs, selection inputs, and other inputs.

For instance, and as can be seen in FIG. 1, the track ball 32 is rotatable about a horizontal axis 34A to provide vertical scrolling, navigational, selection, or other inputs. Similarly, the track ball 32 is rotatable about a vertical axis 34B to provide horizontal scrolling, navigational, selection, or other inputs. Since the track ball 32 is freely rotatable with respect to the housing 6, the track ball 32 is additionally rotatable about any other axis (not expressly depicted herein) that lies within the plane of the page of FIG. 1 or that extends out of the plane of the pave of FIG. 1.

The track ball 32 can be said to be a multiple-rods input device because it provides scrolling, navigational, selection, and other inputs in a plurality of directions or with respect to a plurality of axes, such as providing inputs in both the vertical and the horizontal directions. It is reiterated that the track ball 32 is merely one of many multiple-axis input devices that could be employed on the mobile electronic device 4. As such, mechanical alternatives to the track ball 32, such as a joystick, might have a limited rotation with respect to the housing 6, and non-mechanical alternatives might be immovable with respect to the housing 6, yet all are capable of providing input in a plurality of directions and/or along a plurality of axes.

The track ball 32 additionally is translatable toward the housing 6, i.e., into the plane of the page of FIG. 1, to provide additional inputs. The track ball 32 could be translated in such a fashion by, for example, a user applying an actuating force to the track ball 32 in a direction toward the housing 6, such as by pressing on the track ball 32. The inputs that are provided to the processor apparatus 16 as a result of a translation of the track hall 32 in the indicated fashion can be employed by the routines 44, for example, as selection inputs, delimiter inputs, or other inputs.

The dictionary 42 in the example embodiment depicted herein is a Chinese dictionary, meaning that it includes Simplified Chinese words that are each comprised of one or more Standard Mandarin characters and includes Traditional Chinese words that are each comprised of one or more Traditional Chinese characters. The example character table 45 includes the unicode designation of each Standard Mandarin character and each Traditional Chinese character, and each such unicode has associated therewith all of its possible Pinyin syllable IDs or all of its BoPoMoFo syllable IDs or both. A Pinyin syllable ID is a representation of a Pinyin, and a BoPoMoFo syllable ID is a representation of a BoPoMoFo string.

The Pinyin custom wordlist 52 is a listing of Standard Mandarin characters and words that have been custom entered by a user, along with the corresponding Pinyins that can be transliterated into such Standard Mandarin characters and words. When a user is entering Pinyin text, i.e., Latin characters into any text field, the transliteration routine 44 compares the Pinyin input with the contents of the dictionary 42 to identify one or more Standard Mandarin characters to output as proposed transliterations of the Pinyin input. Additionally, the transliteration routine 44 compares the Pinyin input with the Pinyin custom wordlist 52 in order to find additional Standard Mandarin characters and words to output as proposed transliterations of the Pinyin input.

The BoPoMoFo custom wordlist 56 is a listing of various Traditional Chinese characters and words that have been custom entered by a user, along with the BoPoMoFo character or characters, and any additional tone, which can be transliterated into such Traditional Chinese characters or words. When the user types BoPoMoFo characters into any text field on the mobile electronic device 4, the transliteration routine 44 compares the BoPoMoFo input with the contents of the dictionary 42 to identify Traditional Chinese characters and words as proposed transliterations of the BoPoMoFo input. In such situations, the transliteration routine 44 additionally compares the BoPoMoFo input with the BoPoMoFo custom wordlist 56 to identify additional Traditional Chinese characters and words as other possible transliterations of the BoPoMoFo input.

For the sake of simplicity, the Pinyin custom wordlist 52 is depicted herein as comprising Standard Mandarin characters and corresponding pins in Latin letters, and the BoPoMoFo custom wordlist is depicted herein as comprising Traditional Chinese characters and corresponding BoPoMoFo strings. It is noted, however, that the Pinyin custom wordlist 52 and the BoPoMoFo custom wordlist 56 typically will comprise unicode designations of Standard Mandarin characters and Traditional Chinese characters, respectively, and further will comprise Pinyin syllable IDs and BoPoMoFo syllable IDs instead of storing the Pinyins and the BoPoMoFos themselves. Moreover, the various entries in the Pinyin custom wordlist 52 and the BoPoMoFo custom wordlist 56 may contain additional data contents regarding frequency of usage and other information, for example, that is not expressly depicted herein.

In order to facilitate the transliteration of Pinyin input or BoPoMoFo input or both on the mobile electronic device 4, data in the form of textual objects that have previously been stored on the mobile electronic device 4, such as may result from such data having been custom entered by a user into a data source such as the address book 46, is additionally stored in a searchable fashion in the Pinyin custom wordlist 52, the BoPoMoFo custom wordlist 56, or both. Specifically, the character table 45 comprises integer data associated with each entry which indicates whether the specific character is a Standard Mandarin character, a Traditional Chinese character, or both. When a new entry in the form of a textual object such as a word or character is initially entered into an input field, such as a data field of an address book dialog, the input is at some point thereafter compared with the character table 45 to determine whether its characters are Standard Mandarin characters or Traditional Chinese characters or both. In the situation wherein the new data entry comprises Standard Mandarin characters, a new entry is stored in the Pinyin custom wordlist 52. Specifically, the new data entry comprises the new Standard Mandarin characters in the form of a stored Standard Mandarin entry 64, and it further comprises the corresponding Pinyin in the form of a stored Pinyin entry 60, both of which can be seen in FIG. 3.

Whenever a new entry into an input field comprises Traditional Chinese characters, a new data entry is stored in the BoPoMoFo custom wordlist 56. Such a new entry comprises the new Traditional Chinese characters in the form of a stored Traditional Chinese character entry 72, and it further comprises the corresponding BoPoMoFo characters in the form of a stored BoPoMoFo entry 68.

It is expressly noted that the address book described herein is merely an example of a data source that provides a dialog which can be used to receive an initial input of a textual object and a data source from which such custom data can be obtained for storage in the Pinyin custom wordlist 52, the BoPoMoFo custom wordlist 56, or both. In this regard, other data sources such as an email in-box, the content of received email messages, and the like can be employed to obtain such custom data in accordance with the claimed concept. It is also noted that the initial input of the textual objects, such as into the exemplary address book dialog mentioned herein, can be done in any fashion and is not limited to being input as a Pinyin input or a BoPoMoFo input.

Figure 3:
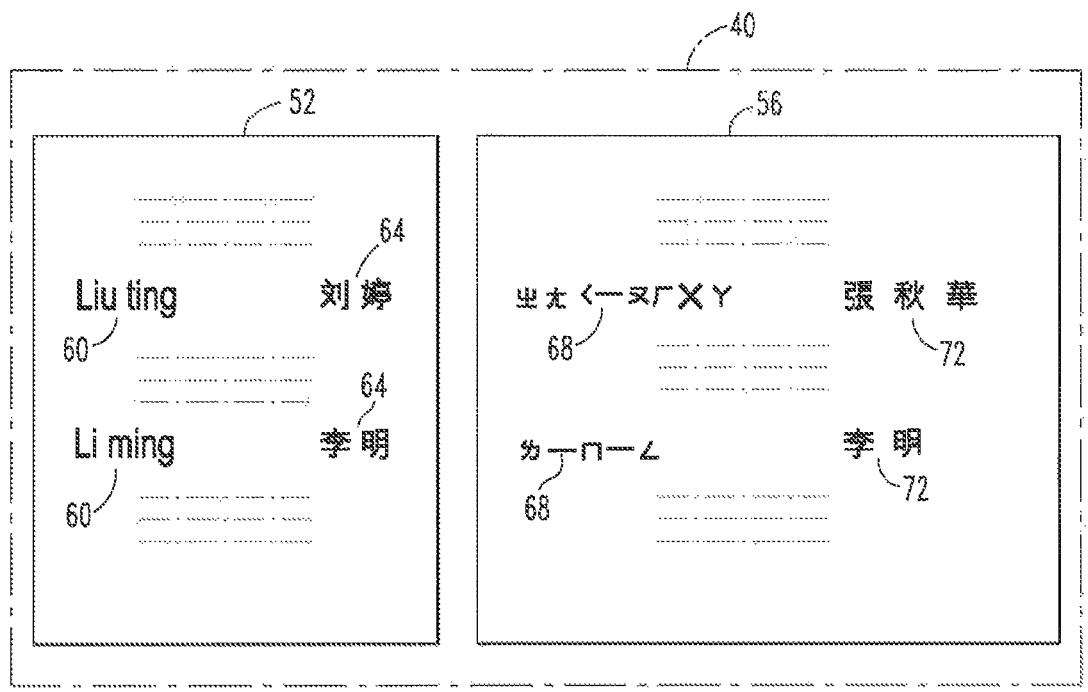
FIG. 3 depicts a pair of custom word lists that can be stored in a memory of the mobile electronic device of FIG. 1, according to an example embodiment.

FIG. 3 generally depicts in a schematic fashion portions of the Pinyin custom wordlist 52 and the BoPoMoFo custom wordlist 56. The Pinyin custom wordlist 52 indicates, among other entries, a Pinyin entry 60 "Liu Ting" along with a Standard Mandarin entry 64. The BoPoMoFo custom wordlist 56 includes a BoPoMoFo entry 68 and a corresponding Traditional Chinese entry 72. The aforementioned entries in the Pinyin custom wordlist 52 and the BoPoMoFo custom wordlist 56 resulted from inputs into a data source which, in the example presented herein, is the address book 46. For example, the user may have typed the Pinyin input "Liu Ting" into an input field of an exemplary address book dialog, and the transliteration routine 44 may have transliterated the Pinyin input into the Standard Mandarin, after which both were stored in the Pinyin custom wordlist 52. On the other hand, the Standard Mandarin may have been otherwise entered, such as with the use of a stroke-based input system or otherwise, and the corresponding Pinyin "Liu Ting" may have been created by transliteration routine 44 from a comparison of the Standard Mandarin input with the character table 45, for instance. As such, the creation of the new entries in the Pinyin custom wordlist 52 is independent of the particular fashion in which the new entry was created in the data source. The same can be said for the new entries in the BoPoMoFo custom wordlist 56.

An entry of the Chinese name 李 明 appears in both the Pinyin custom wordlist 52 and the BoPoMoFo custom wordlist 56 because the name comprises characters that are both Standard Mandarin and Traditional Chinese, i.e., they are characters that overlap the two character sets. As such, when the new entry of 李 明 was initially received in the exemplary address book 46, the Chinese characters were stored as a Standard Mandarin entry 64 along with a Pinyin entry 60 "Li Ming" in the Pinyin custom wordlist 52, and the Chinese characters were additionally stored as a Traditional Chinese entry 72 along with a corresponding BoPoMoFo entry 68 ㄌ一 ㄇ一ㄥ in the BoPoMoFo custom wordlist 56.

By storing data from the data source in the Pinyin custom wordlist 52 and the BoPoMoFo custom wordlist 56, additional transliteration results can be obtained and proposed to the user when the user is entering text. For instance, if the user is beginning to enter as a text input the Pinyin input "Liu Ting", the Standard Mandarin transliteration 刘 婷 will be available for outputting to the user as a proposed transliteration since it was already input into the exemplary address book 46 at an earlier time and thus was re-stored in the Pinyin custom wordlist 52. In this regard, if the text input is in an incomplete condition, meaning that if transliterated it would result in less than the entirety of the textual object 刘 婷, the output of the Standard Mandarin 刘 婷 as a transliteration of the text input will also serve as a proposed completion of the text input. Similarly, if the user begins to type as a text input the BoPoMoFo sequence ㄔㄤ ㄑ一ㄡ ㄏㄨㄚ, the Traditional Chinese name 張 秋 華 will be identified from a search of the BoPoMoFo custom wordlist 56 and will be output to the user as a proposed transliteration of the text input and possibly also as a proposed completion if the text input is incomplete. It can further be seen that the storage of the Chinese name 李 明 in both the Pinyin custom wordlist 52 and the BoPoMoFo custom wordlist 56 will enable the name to be identified and output as a proposed transliteration when either of the Pinyin "Li Ming" and the BoPoMoFo ㄌ一 ㄇ一ㄥ is input.

It is noted that the initial inputting of a data into the exemplary address book 46 is indicated above as triggering the generation of possible additional entries in the Pinyin custom wordlist 52 or the BoPoMoFo custom wordlist 56 or both. It is noted, however, that any of a wide variety of other events can trigger the generation of such entries based upon data that has been received in the data source which, in the present example, is the address book 46. For example, the synchronizing of the mobile electronic device 4 with another device or other such event can alternatively be used to create the new entries in the Pinyin custom wordlist 52 or the BoPoMoFo custom wordlist 56 or both.

Figure 4:
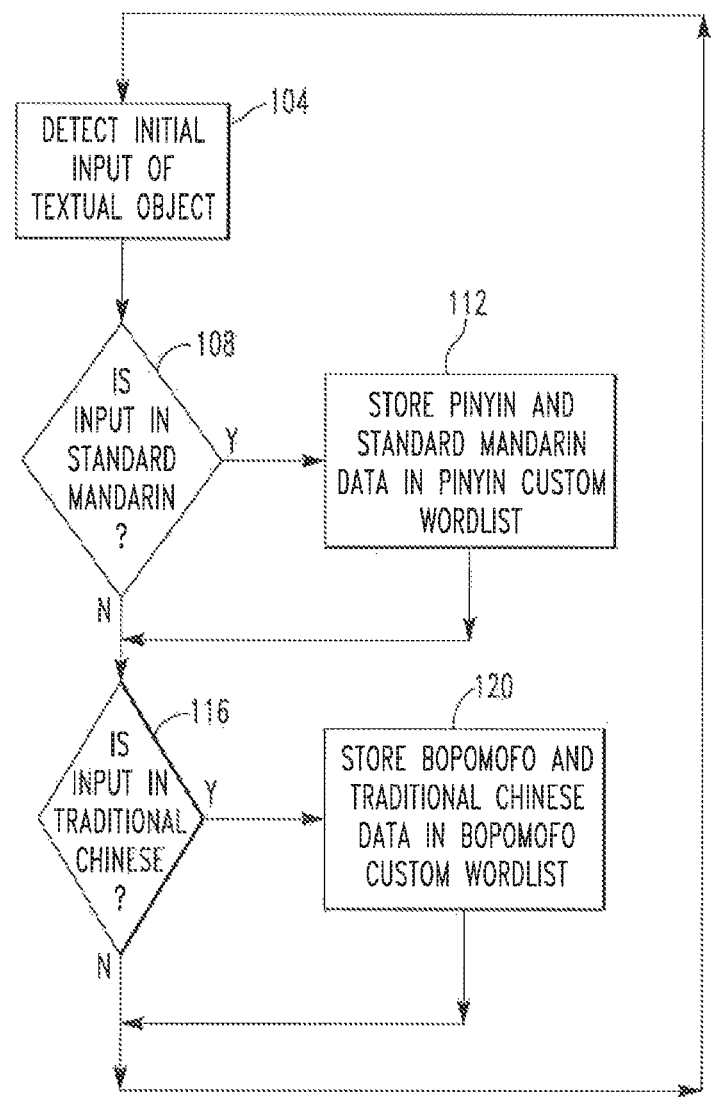
FIG. 4 is a flowchart depicting certain aspects of an improved method that can be performed on the mobile electronic device of FIG. 1, according to an example embodiment.

FIG. 4 depicts a flowchart setting forth certain aspects of an example embodiment of a method by which data that is stored in the exemplary address book 46 or other data source becomes stored as additional entries in the Pinyin custom wordlist 52, the BoPoMoFo custom wordlist 56, or both. Processing begins at 104 where an initial input of a textual object such as a word, a character, etc., is detected. It is then determined, as at 108, whether the input is in Standard Mandarin characters, and this determination would be made by consulting, for example, the character table 45 or possibly the dictionary 42 or other linguistic sources. If it is determined at 108 that the characters are Standard Mandarin characters, processing continues at 112 where the Pinyin sequence and the Standard Mandarin characters are stored as a Pinyin entry 60 and a Standard Mandarin entry 64, respectively, in the Pinyin custom wordlist 52.

Regardless of the result at 108, processing ultimately continues as at 116 where it is determined whether the input is in Traditional Chinese characters. If so, processing continues at 120 where the Traditional Chinese characters and the corresponding BoPoMoFo sequence are added as a Traditional Chinese entry 72 and a BoPoMoFo entry 68, respectively, in the custom wordlist 56. Processing thereafter continues, as at 104, where additional input can be detected.

It thus can be seen that a new entry that comprises Standard Mandarin characters will be stored as a new entry in the Pinyin custom wordlist 52, and that a new entry that comprises Traditional Chinese characters will be stored in the BoPoMoFo custom wordlist 56. It is reiterated that if the characters are both Standard Mandarin and Traditional Chinese, i.e., the characters overlap both character sets, new entries will be made in both the Pinyin custom wordlist 52 and the BoPoMoFo custom wordlist 56.

Figure 5:
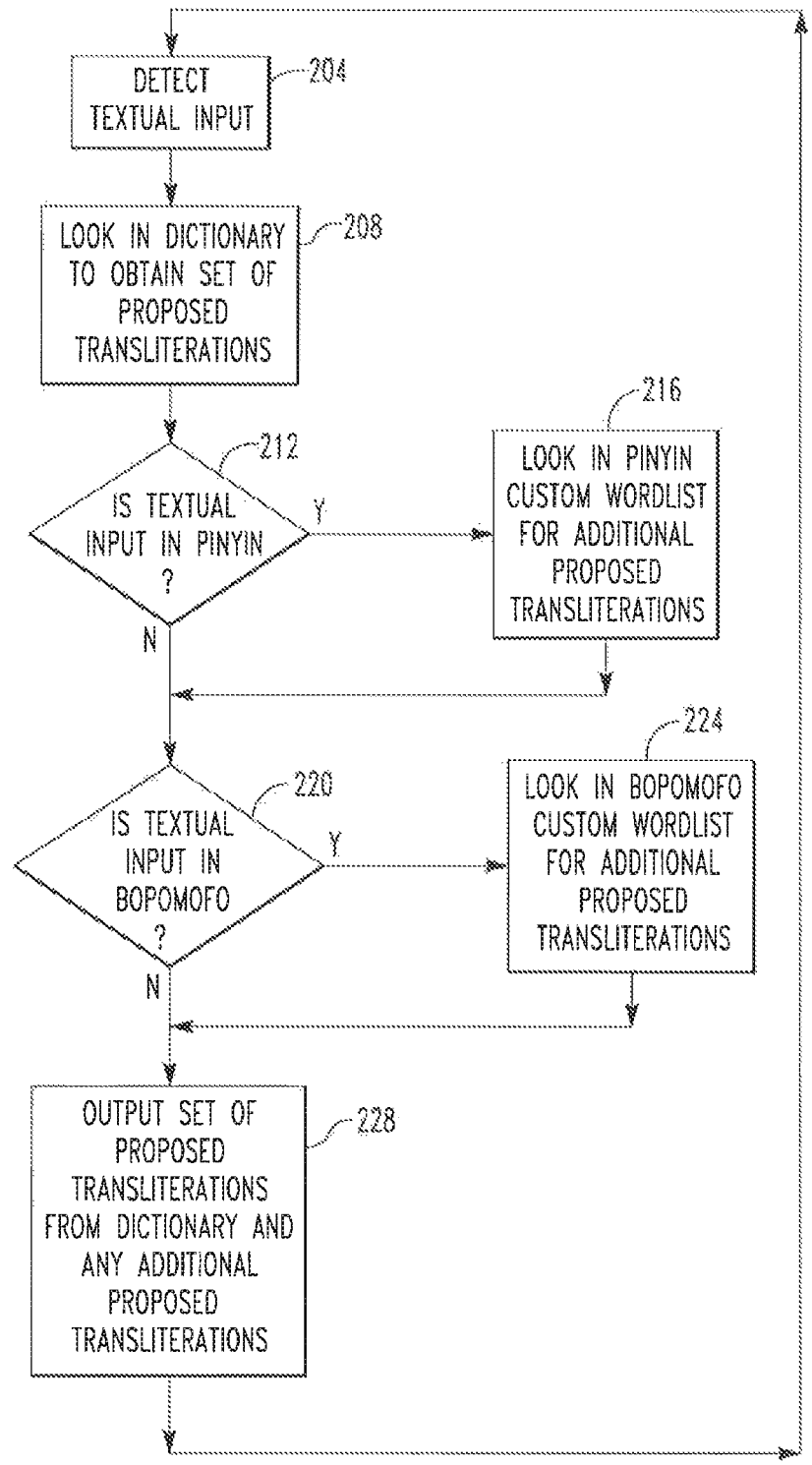
FIG. 5 is a flowchart depicting certain aspects of another improved method that can be performed on the mobile electronic device of FIG. 1, according to an example embodiment.

FIG. 5 depicts a flowchart demonstrating certain aspects of an example embodiment of a method by which entries in the Pinyin custom wordlist 52 or the BoPoMoFo custom wordlist 56 or both can be provided as possible transliterations of a text input received in any text field. Processing begins, as at 204, where a textual input is detected. Processing thereafter continues at 208 where the textual input is compared with the dictionary 42 to obtain a set of transliterations for the textual input. It is then determined, as at 212, whether the textual input is in Pinyin, i.e., Latin characters. If so, processing continues, as at 216, where the Pinyin custom wordlist 52 is analyzed for possible additional transliterations of the textual input. That is, it will be determined whether the Pinyin input detected at 204 has any correspondence to any Pinyin entries 60 in the Pinyin custom wordlist 52.

Processing thereafter continues from both 212 and 216 to 220 where it is determined whether the textual input is in BoPoMoFo characters. If so, processing continues at 224 where the transliteration routine 44 looks in the BoPoMoFo custom wordlist 56 to determine whether any BoPoMoFo entries 68 exist therein that correspond with the BoPoMoFo textual input and, if so, the Traditional Chinese entries 72 that correspond with any such BoPoMoFo entries 68 will be identified as possible additional transliterations of the textual input. Processing thereafter continues, as at 228, where the transliteration routine 44 outputs a set of proposed transliterations that include the transliterations obtained from the dictionary 42, as at 208, as well as any additional transliterations that may have been identified at 216 or 224 or both.

Thus new entries in the address book 46 or other data sources are enabled to be stored in the Pinyin custom wordlist 52, the BoPoMoFo custom wordlist 56, or both. This enables and facilitates the inputting of text in any input field because additional proposed transliteration results can be retrieved from the Pinyin custom wordlist 52 or the BoPoMoFo custom wordlist 56 or both upon entering a textual input.

Regarding the multiple-axis input device, it is noted that such multiple-axis input device is useful. For instance, an example embodiment home screen output that can be visually output on the display 18 is depicted in FIG. 6 as including a plurality of icons 1062 that are selectable by the user for the purpose of, for example, initiating the execution on the processor apparatus 16 of a routine 44 that is represented by an icon 1062. The track ball 32 is rotatable to provide, for example, navigational inputs among the icons 1062.

For example, FIG. 6 depicts the travel of an indicator 1066 from the icon 1062A, as is indicated in broken lines with the indicator 1066A, to the icon 1062B, as is indicated in broken lines with the indicator 1066B, and onward to the icon 1062C, as is indicated by the indicator 1066C. It is understood that the indicators 1066A, 1066B, and 1066C are not necessarily intended to be simultaneously depicted on the display 18, but rather are intended to together depict a series of situations and to indicate movement of the indicator 1066 among the icons 1062. The particular location of the indicator 1066 at any given time indicates to a user the particular icon 1062, for example, that is the subject of a selection focus of the mobile electronic device 4. Whenever an icon 1062 or other selectable object is the subject of the selection focus, a selection input to the processor apparatus 16 will result in execution or initiation of the routine 44 or other function that is represented by the icon 1062 or other selectable object.

The movement of the indicator 1066 from the icon 1062A, as indicated with the indicator 1066A, to the icon 1062B, as is indicated by the indicator 1066B, was accomplished by rotating the track ball 32 about the vertical axis 34B to provide a horizontal navigational input. As mentioned above, a rotation of the track ball 32 a predetermined rotational distance results in an input to the processor apparatus 16. In this example, the track ball 32 would have been rotated about the vertical axis 34B a rotational distance equal to three times the predetermined rotational distance since the icon 62B is disposed three icons 1062 to the right the icon 1062A. Such rotation of the track ball 32 likely would have been made in a single motion by the user, but this need not necessarily be the case.

Similarly, the movement of the indicator 1066 from the icon 1062B, as indicated by the indicator 1066B, to the icon 1062C, as is indicated by the indicator 1066C, was accomplished by the user rotating the track ball 32 about the horizontal axis 34A to provide a vertical navigational input. In so doing, the track ball 32 would have been rotated a rotational distance equal to two times the predetermined rotational distance since the icon 1062C is disposed two icons 1062 below the icon 1062B. Such rotation of the track ball 32 likely would have been made in a single motion by the user, but this need not necessarily be the case.

It thus can be seen that the track ball 32 is rotatable in various directions to provide various navigational and other inputs to the processor apparatus 16. Rotational inputs by the track ball 32 typically are interpreted by whichever routine 44 is active on the mobile electronic device 4 as inputs that can be employed by such routine 44. For example, the GUI 44 that is active on the mobile electronic device 4 in FIG. 6 requires vertical and horizontal navigational inputs to move the indicator 1066, and thus the selection focus, among the icons 1062. If a user rotated the track ball 32 about an axis oblique to the horizontal axis 34A and the vertical axis 34B, the GUI 44 likely would resolve such an oblique rotation of the track ball 32 into vertical and horizontal components which could then be interpreted by the GUI 44 as vertical and horizontal navigational movements, respectively. In such a situation, if one of the resolved vertical and horizontal navigational movements is of a greater magnitude than the other, the resolved navigational movement having the greater magnitude would be employed by the GUI 44 as a navigational input in that direction to move the indicator 1066 and the selection focus, and the other resolved navigational movement would be ignored by the GUI 44, for example.

When the indicator 1066 is disposed on the icon 1062C, as is indicated by the indicator 1066C, the selection focus of the mobile electronic device 4 is on the icon 1062C. As such, a translation of the track ball 32 toward the housing 6 as described above would provide an input to the processor apparatus 16 that would be interpreted by the GUI 44 as a selection input with respect to the icon 1062C. In response to such a selection input, the processor apparatus 16 would, for example, begin to execute a routine 44 that is represented by the icon 1062C. It thus can be understood that the track ball 32 is rotatable to provide navigational and other inputs in multiple directions, assuming that the routine 44 that is currently active on the mobile electronic device 4 can employ such navigational or other inputs in a plurality of directions, and can also be translated to provide a selection input, or other input.

Figure 8:
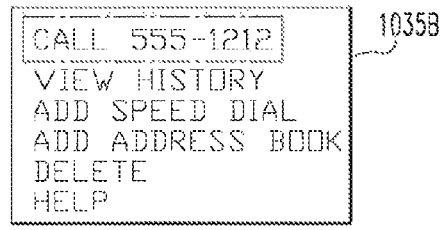
FIG. 8 depicts another menu, according to an example embodiment.

As mentioned above, FIG. 7 depicts an example embodiment menu 1035A that would be appropriate if the user's current logical location within the logical menu tree was viewing an email within an email routine 44. That is, the menu 1035A provides selectable options that would be appropriate for a user given that the user is, for example, viewing an email within an email routine 44. In a similar fashion. FIG. 8 depicts another example embodiment menu 1035B that would be depicted if the user's current logical location within the logical menu tree was within a telephone routine 44.

Rotational movement inputs from the track bail 32 could be employed to navigate among, for example, the menus 1035A and 1035B. For instance, after an actuation of the <MENU> key 33 and an outputting by the GUI 44 of a resultant menu, the user could rotate the track ball 32 to provide scrolling inputs to successively highlight the various selectable options within the menu. Once the desired selectable option is highlighted, i.e., is the subject of the selection focus, the user could translate the track ball 32 toward the housing 6 to provide a selection input as to the highlighted selectable option. In this regard, it is noted that the <MENU> key 33 is disposed adjacent the track ball 32. This enables, for instance, the generation of a menu by an actuation the <MENU> key 33, conveniently followed by a rotation the track ball 32 to highlight a desired selectable option, for instance, followed by a translation of the track ball 32 toward the housing 6 to provide a selection input to initiate the operation represented by the highlighted selectable option.

It is further noted that one of the additional inputs that can be provided by a translation of the track ball 32 is an input that causes the GUI 44 to output a reduced menu. For instance, a translation of the track ball 32 toward the housing 6 could result in the generation and output of a more limited version of a menu than would have been generated if the <MENU> key 33 had instead been actuated. Such a reduced menu would therefore be appropriate to the user's current logical location within the logical menu tree and would provide those selectable options which the user would have a high likelihood of selecting. Rotational movements of the track ball 32 could provide scrolling inputs to scroll among the selectable options within the reduced menu 1035C, and translation movements of the track ball 32 could provide selection inputs to initiate whatever function is represented by the selectable option within the reduce menu 1035C that is currently highlighted.

Figure 9:
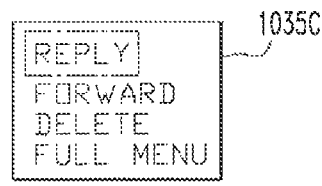
FIG. 9 depicts a reduced menu, according to an example embodiment.

By way of example, if instead of actuating the <MENU> key 33 to generate the menu 1035A the user translated the track ball 32, the GUI 44 would generate and output on the display the reduced menu 1035C that is depicted generally in FIG. 9. The example embodiment reduced menu 1035C provides as selectable options a number of the selectable options from the menu 1035A that the user would be most likely to select. As such, a user seeking to perform a relatively routine function could, instead of actuating the <MENU> key 33 to display the full menu 1035A, translate the track hall 32 to generate and output the reduced menu 1035C. The user could then conveniently rotate the track ball 32 to provide scrolling inputs to highlight a desired selectable option, and could then translate the track ball 32 to provide a selection input which would initiate the function represented by the selectable option in the reduced menu 1035C that is currently highlighted.

In an example embodiment, many of the menus that could be generated as a result of an actuation of the <MENU> key 33 could instead be generated and output in reduced form as a reduced menu in response to a translation of the track ball 32 toward the housing 6. It is noted, however, that a reduced menu might not be available for each full menu that could be generated from an actuation of the <MENU> key 33. Depending upon the user's specific logical location within the logical menu tree, a translation of the track ball 32 might be interpreted as a selection input rather than an input seeking a reduced menu. For instance, a translation of the track ball 32 on the home screen depicted in FIG. 1 would result in a selection input as to whichever of the icons 1062 is the subject of the input focus. If the <MENU> key 33 was actuated on the home screen, the GUI 44 would output a menu appropriate to the home screen, such as a full menu of all of the functions that are available on the mobile electronic device 4, including those that might not be represented by icons 1062 on the home screen.

Figure 10:
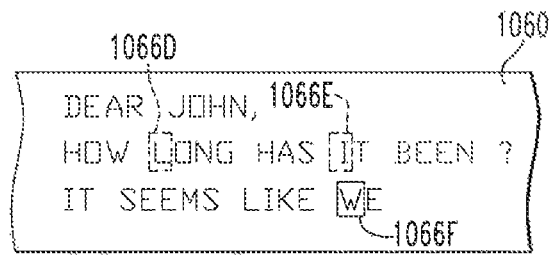
FIG. 10 is an output such as could occur during another text entry or text editing operation, according to an example embodiment.

FIG. 10 depicts a quantity of text that is output on the display 18, such as during a text entry operation or during a text editing operation, for example. The indicator 1066 is depicted in FIG. 10 as being initially over the letter "L", as is indicated with the indicator 1066D, and having been moved horizontally to the letter "I", as is indicated by the indicator 1066E, and thereafter vertically moved to the letter "W", as is indicated by the indicator 1066F. In a fashion similar to that in FIG. 6, the cursor 1066 was moved among the letters "L", "I", and "W" through the use of horizontal and vertical navigational inputs resulting from rotations of the track ball 32. In the example of FIG. 10, however, each rotation of the track hall 32 the predetermined rotational distance would move the indicator 1066 to the next adjacent letter. As such, in moving the indicator 1066 between the letters "L" and "I," the user would have rotated the track ball 32 about the vertical axis 1034B a rotational distance equal to nine times the predetermined rotational distance, for example, since "I" is disposed nine letters to the right of "L".

Figure 11:
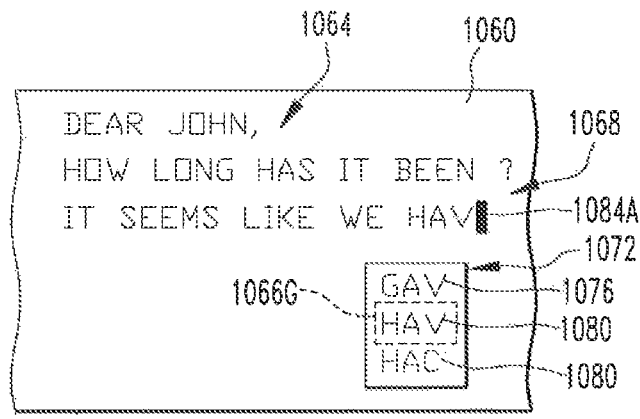
FIG. 11 is an output during another text entry operation, according to an example embodiment.

FIG. 11 depicts an output 1064 on the display 18 during, for example, a text entry operation that employs the disambiguation routine 44. The output 1064 can be said to comprise a text component 1068 and a variant component 1072. The variant component 1072 comprises a default portion 1076 and a variant portion 1080. FIG. 11 depicts the indicator 1066G on the variant 1080 "HAV", such as would result from a rotation of the track ball 32 about the horizontal axis 34A to provide a downward vertical scrolling input. In this regard, it is understood that a rotation of the track ball 32 a distance equal to the predetermined rotational distance would have moved the indicator 1066 from a position (not expressly depicted herein) disposed on the default portion 1076 to the position disposed on the first variant 1080, as is depicted in FIG. 11. Since such a rotation of the track ball 32 resulted in the first variant 1080 "HAV" being highlighted with the indicator 1066G, the text component 1068 likewise includes the text "HAV" immediately preceding a cursor 1084A.

Figure 12:
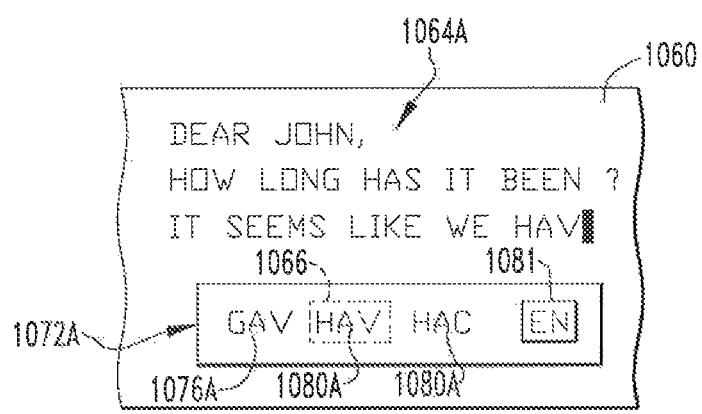
FIG. 12 is an alternative output during the text entry operation of FIG. 11, according to an example embodiment.

FIG. 12 depicts an alternative output 1064A having an alternative variant component 1072A having a default portion 1076A and a variant portion 1080A. The variant component 1072A is horizontally arranged, meaning that the default portion 1076A and the variants 1080A are disposed horizontally adjacent one another and can be sequentially selected by the user through the use of horizontal scrolling inputs, such as by the user rotating the track ball 32 the predetermined rotational distance about the vertical axis 34B. This is to be contrasted with the variant component 1072 of FIG. 11 wherein the default portion 1076 and the variants 1080 are vertically arranged, and which can be sequentially selected by the user through the user of vertical scrolling inputs with the track ball 32.

In this regard, it can be understood that the track ball 32 can provide both the vertical scrolling inputs employed in conjunction with the output 1064 as well as the horizontal scrolling inputs employed in conjunction with the output 1064A. For instance, the disambiguation routine 44 potentially could allow the user to customize the operation thereof by electing between the vertically arranged variant component 1072 and the horizontally arranged variant component 1072A. The track ball 32 can provide scrolling inputs in the vertical direction and/or the horizontal direction, as needed, and thus is operable to provide appropriate scrolling inputs regardless of whether the user chooses the variant component 1072 or the variant component 1072A. That is, the track ball 32 can be rotated about the horizontal axis 34A to provide the vertical scrolling inputs employed in conjunction with the variant component 1072, and also can be rotated about the vertical axis 34B to provide the horizontal scrolling inputs that are employed in conjunction with the variant component 1064A. The track ball 32 thus could provide appropriate navigational, strolling, selection, and other inputs depending upon the needs of the routine 44 active at any time on the mobile electronic device 4. The track ball 32 enables such navigational, strolling, selection, and other inputs to be intuitively generated by the user through rotations of the track hall 32 in directions appropriate to the active routine 44, such as might be indicated on the display 18.

It can further be seen from FIG. 12 that the variant component 1072A additionally includes a value 1081 that is indicative of the language into which the disambiguation routine 44 will interpret ambiguous text input. In the example depicted in FIG. 12, the language is English.

Figure 13:
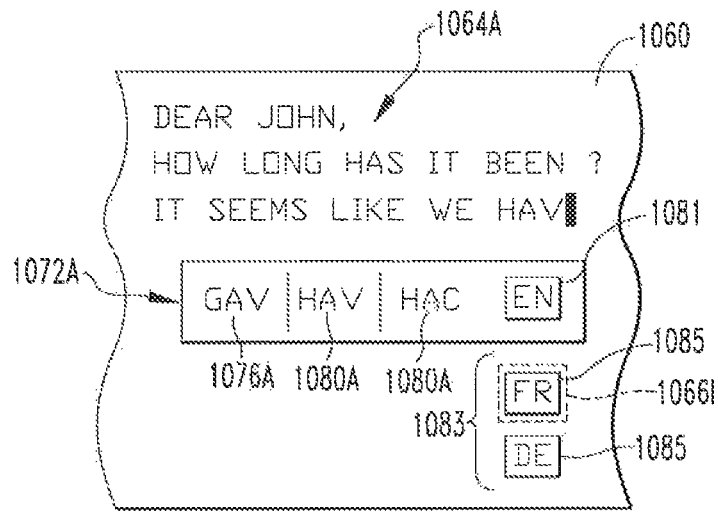
FIG. 13 is another output during another part of the text entry operation of FIG. 11, according to an example embodiment.

As can be seen in FIG. 13, the value 1081 can be selected by the user to cause the displaying of a list 1083 of alternative values 1085. The alternative values 1085 are indicative of selectable alternative languages into which the disambiguation routine 44 can interpret ambiguous input. A selection of the value 1081 would have been achieved, for example, by the user providing horizontal scrolling inputs with the track ball 32 to cause (not expressly depicted herein) the indicator 1066 to be disposed over the value 1081, and by thereafter translating the track ball 32 toward the housing 6 to provide a selection input.

The alternative values 1085 in the list 1083 are vertically arranged with respect to one another and with respect to the value 1081. As such, a vertical scrolling input with the track ball 32 can result in a vertical movement of the indicator 1066I to a position on one of the alternative values 1085 which, in this example, is the alternative value 1085 "FR", which is representative of the French language. The alternative value 1085 "FR" could become selected by the user in any of a variety of fashions, such as by actuating the track ball 32 again, by continuing to enter text, or in other fashions. It thus can be understood from FIG. 12 and FIG. 13 that the track ball 32 can be rotated to provide horizontal scrolling inputs and, when appropriate, to additionally provide vertical scrolling inputs and, when appropriate, to additionally provide selection inputs, for example.

Figure 14:
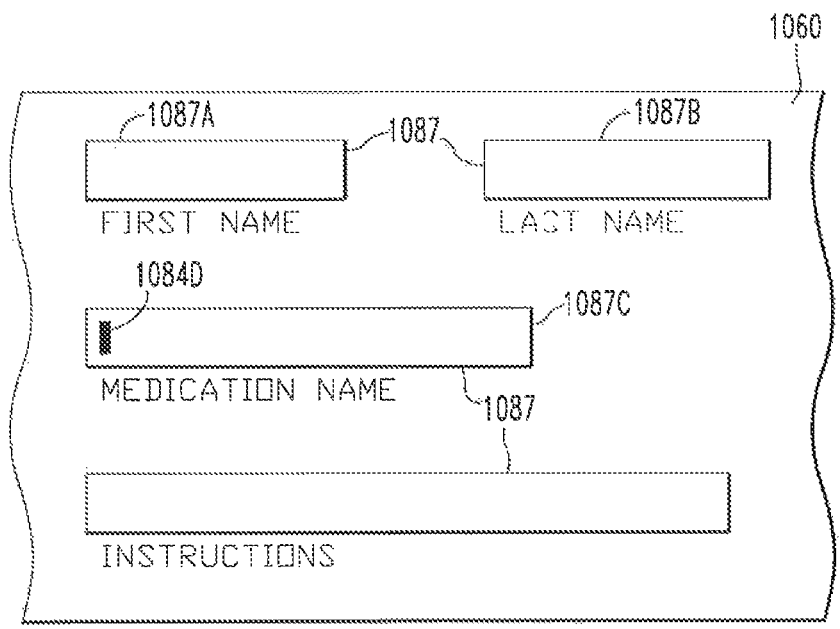
FIG. 14 is an output during a data entry operation, according to an example embodiment.

FIG. 14 depicts another example embodiment output on the display 18 such as might be employed by a data entry routine 44. The example embodiment output of FIG. 14 comprises a plurality of input fields 1087 with corresponding descriptions. A cursor 1084D, when disposed within one of the input fields 1087, indicates to the user that an input focus of the mobile electronic device 4 is on that input field 1087. That is, data such as text, numbers, symbols, and the like, will be entered into whichever input field 1087 is active, i.e., is the subject of the input focus. It is understood that the mobile electronic device 4 might perform other operations or take other actions depending upon which input field 1087 is the subject of the input focus.

Navigational inputs from the track ball 32 enable the cursor 1084D, and thus the input focus, to be switched, i.e., shifted, among the various input fields 1087. For example, the input fields 1087 could include the input fields 1087A, 1087B, and 1087C, FIG. 14 depicts the cursor 1084D as being disposed in the input field 1087C, indicating that the input field 1087C is the subject of the input focus of the mobile electronic device 4. It is understood that the cursor 1084D, and thus the input focus, can be shifted from the input field 1087C to the input field 1087A, which is disposed adjacent and vertically above the input field 1087C, by providing a vertical scrolling input in the upward direction with the track ball 32. That is, the track ball 32 would be rotated the predetermined rotational distance about the horizontal axis 34. Similarly, the cursor 1084D, and thus the input focus, can be shifted from the input field 1087A to the input field 1087B, which is disposed adjacent and to the right of the input field 1087A, by providing a horizontal scrolling input to the right with the track ball 32. That is, such a horizontal scrolling input could be provided by rotating the track ball the predetermined rotational distance about the vertical axis 34B. It thus can be seen that the track ball 32 is rotatable in a plurality of directions about a plurality axes to provide navigational, scrolling, and other inputs in a plurality of directions among a plurality of input fields 1087. Other types of inputs and/or inputs in other applications will be apparent.

Figure 15:
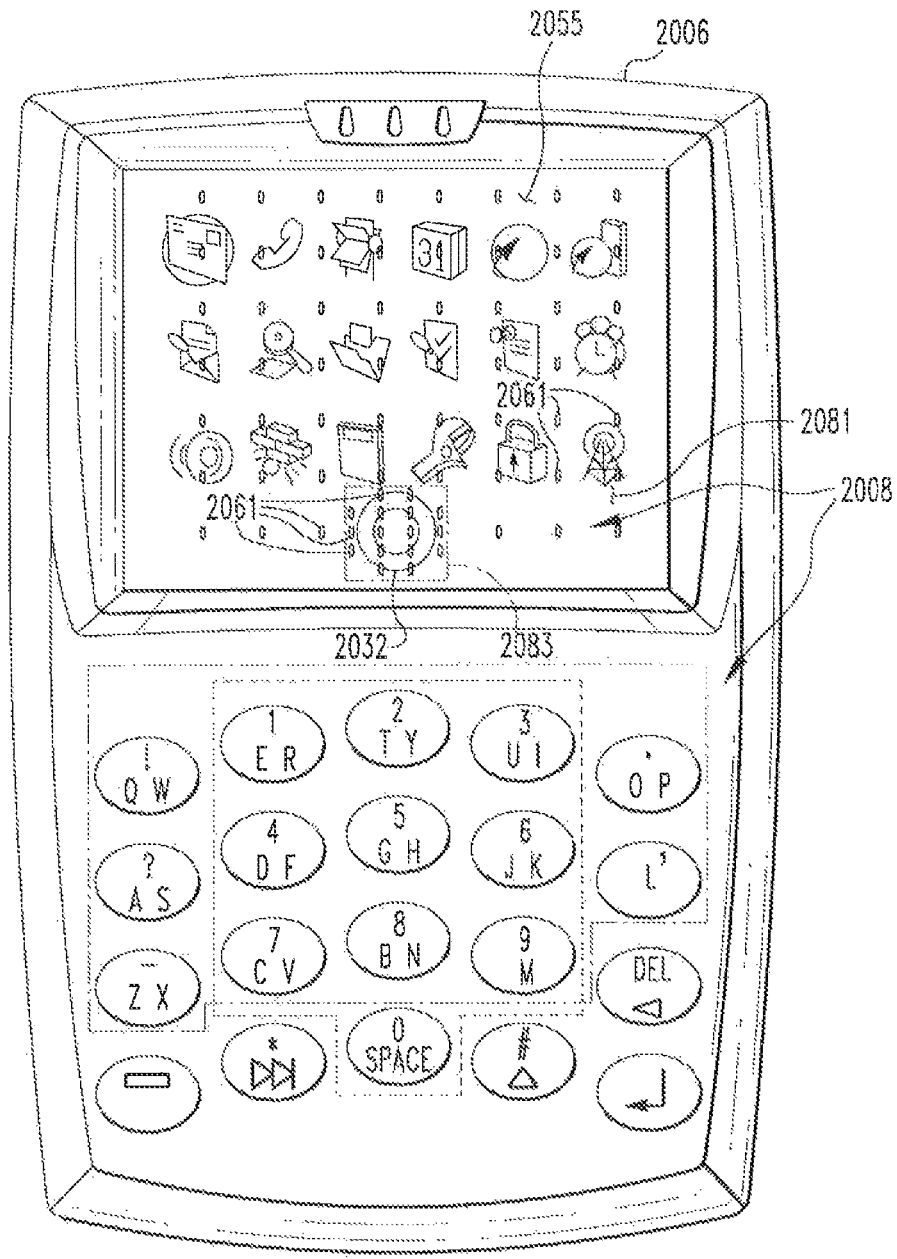
FIG. 15 is a top plan view of an improved mobile electronic device according to another example embodiment.
Figure 16:
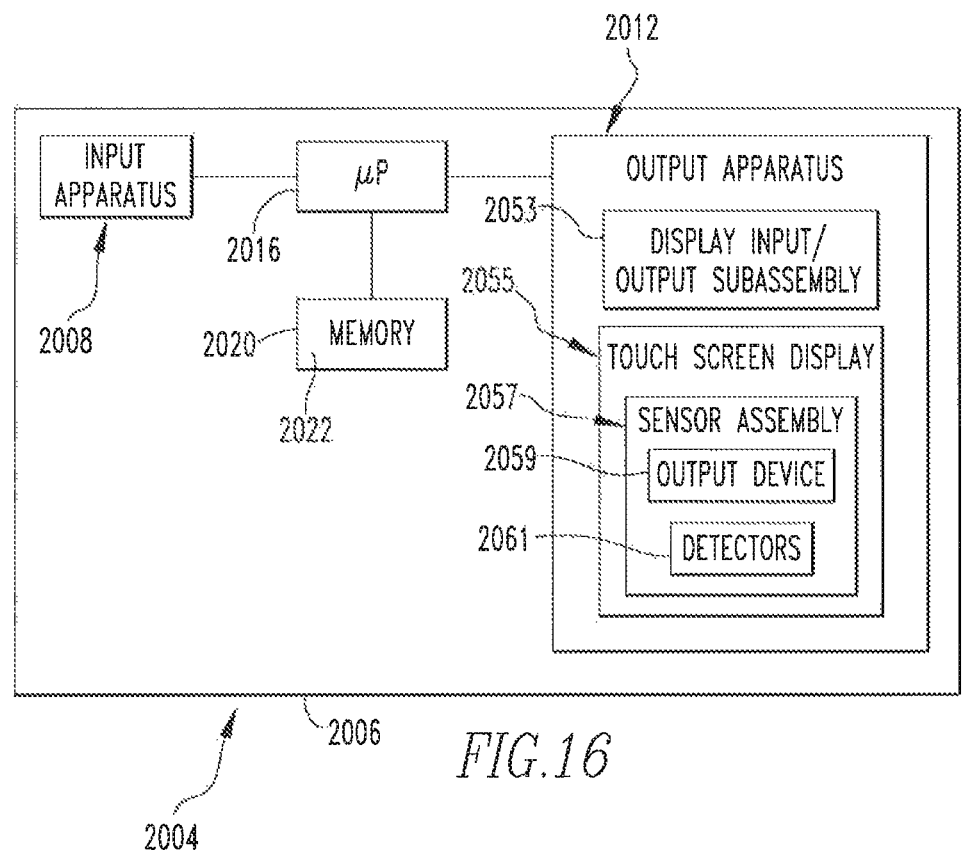
FIG. 16 is a schematic depiction of the improved mobile electronic device of FIG. 15, according to an example embodiment.

An improved mobile electronic device 2004 in accordance with still another example embodiment is depicted generally in FIG. 15 and FIG. 16. The mobile electronic device 2004 includes a housing 2006 upon which are disposed an input apparatus 2008, an output apparatus 2012, and a processor apparatus 2016. The processor apparatus 2016 comprises a processor 2036 and a memory 2040 having stored therein a number of routines 2044. All of the operations that can be performed on or with the mobile electronic device 4 can be performed on or with the mobile electronic device 2004. As such, the features of the mobile electronic device 2004 that are common with the mobile electronic device 4, and this would comprise essentially all of the features of the mobile electronic device 4, will generally not be repeated.

As a general matter, the mobile electronic device 2004 is substantially identical in configuration and function to the mobile electronic device 4, except that the mobile electronic device 2004 includes a touch screen display 2055 that provides a non-mechanical multiple-axis input device 2032 instead of the track ball 32. The non-mechanical multiple-axis input device 2032 can be said to be in the form of a virtual track ball 2032.

As is generally understood, the touch screen display 2055 includes a liquid crystal layer between a pair of substrates, with each substrate including an electrode. The electrodes form a grid which defines the aperture size of the pixels. When a charge is applied to the electrodes, the liquid crystal molecules of the liquid crystal layer become aligned generally perpendicular to the two substrates. A display input/output subassembly 2053 of the output apparatus 2012 controls the location of the charge applied to the electrodes thereby enabling the formation of images on the touch screen display 2055.

Additionally, the touch screen display 2055 comprises a sensor assembly 2057 which comprises an output device 2059 and a plurality of detectors 2061. The detectors 2061 are shown schematically and are typically too small to be seen by the naked eye. Each detector 2061 is in electrical communication with the output device 2059 and creates an output signal when actuated. The detectors 2061 are disposed in a pattern, discussed below, and are structured to detect an external object immediately adjacent to, or touching, the touch screen display 2055. The external object is typically a stylus or a user's finger (not shown). The output device 2059 and/or the processor 2016 are structured to receive the detector signals and convert the signals to data representing the location of the external object relative to the touch screen display 2055. As such, while the sensor assembly 2057 is physically a component of the touch screen display 2055, it is nevertheless considered to be a logical component of the input apparatus 2008 since it provides input to the processor apparatus.

The detectors 2061 are typically capacitive detectors, optical detectors, resistive detectors, or mechanical detectors such as strain gauge or charged grid, although other technologies may be employed in other example embodiments. Typically, capacitive detectors are structured to detect a change in capacitance caused by the electrical field of the external object or a change in capacitance caused by the compression of the capacitive detector. Optical detectors are structured to detect a reflection of light, e.g., light created by the touch screen display 2055. Mechanical detectors include a charged grid with columns that would be disposed on one side of the touch screen display 2055 and a corresponding grid without columns would be disposed at another location on the touch screen display 2055, in such a configuration, when the touch screen display 2055 is compressed, i.e. as a result of being touched by the user, the columns at the area of compression contact the opposing grid thereby completing a circuit.

Capacitive detectors may be disposed upon either substrate and, although small, require space. Thus, and any pixel that is disposed adjacent a detector 2061 will have a reduced size, or aperture, to accommodate the adjacent detector 2061.

The detectors 2061 are disposed in a pattern, and at least some of the detectors 2061 preferably are arranged in lines that form a grid. A first portion of the detectors 2061 are disposed on a first area 2081 of the touch screen display 2055, and a second portion of the detectors 2061 are disposed on a second area 2083 of the touch screen display 2055. As can be seen from FIG. 15, the first area 2081 essentially is every region of the touch screen display 2005 other than the second area 2083.

The first portion of the detectors 2061 disposed on the first area 2081 of the touch screen display 2055 are disposed in a relatively sparse pattern in order to minimize the visual interference that is caused by the presence of the detectors 2061 adjacent the pixels. Preferably, the spacing of the detectors 2061 on the first area 2081 is between about 1.0 mm and 10.0 mm between the detectors 2061, and more preferably about 3.0 mm between the detectors 2061.

The second portion of the detectors 2061 are disposed in a relatively dense pattern on the second area 2083 of the touch screen display 2055 and are structured to support the function of the virtual track ball 2032. The image quality in the second area 2083 of the touch screen display 2055 is adversely affected due to the dense spacing of the detectors 2061 there. However, the second area 2083 is a relatively small area compared to the entire touch screen display 2055. Preferably, the density of the detectors 2061 in the second area 2083 is between about 0.05 mm and 3.0 mm between the detectors, and more preferably about 0.1 mm between the detectors 2061. Further, because the pixels in the second area 2083 are dedicated for the virtual track ball 2032, it is acceptable to have a reduced pixel density with larger pixels. Since the pixel size would be very large, the aspect ratio would be significantly higher than that of pixels that are not disposed adjacent a detector 2061. The pixels in the second area 2083 likely would be special function pixels, such as pixels that would both depict the virtual track ball 2032 and that would light up the second area 2083 to highlight the virtual track ball 2032.

The processor apparatus is structured to create images and define the boundaries of selectable portions of the images on the touch screen display 2055. For example, the processor apparatus will create the images of selectable icons or other objects on specific portions of the touch screen display 2055. The processor apparatus is further structured to relate specific detectors 2061 to the specific portions of the touch screen display 2055. Thus, when the processor apparatus detects the actuation of a specific detector 2061 adjacent to a specific image, e.g. a selectable icon, the processor apparatus will initiate the function or routine related to that icon, e.g. opening a calendar program.

Similarly, the processor apparatus is structured to employ specific detectors 2061 to support the function of the virtual track hall 2032 in the second area 2083 of the touch screen display 2055. Thus, actuations of one or more of the detectors 2061 that support the virtual track ball 2032 will be interpreted by the processor apparatus as being inputs from the virtual track hall 2032. For instance, an actuation of a sequential plurality of detectors 2061 extending along a particular direction on the touch screen display 2055 in the second area 2083 might be interpreted as a navigational input, a scrolling input, a selection input, and/or another input in the particular direction. Since the user can freely move a finger, for instance, in any direction on the touch screen display 2055, the virtual track ball 2032 is a multiple-axis input device. Other inputs, such as a non-moving actuation of one or more detectors 2061 in the central region of the virtual track hall 2032 could be interpreted by the processor apparatus as an actuation input of the virtual track ball 2032, such as would be generated by an actuation of the track ball 32 of the mobile electronic device 1004 in a direction toward the housing 1006 thereof. It can be understood that other types of actuations of the detectors 2061 in the second area 2083 can be interpreted as various other inputs.

The mobile electronic device 2004 thus comprises a multiple-axis input device 2032 that is non-mechanical but that still provides the same functional features as, say, the track ball 32 of the mobile electronic device 4. It is understood that the virtual track ball 2032 is but one example embodiment of the many types of multiple-axis input devices that could be employed on the mobile electronic device 2004.

While specific example embodiments have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof. Some of the steps illustrated in the flow chart may be performed in an order other than that which is described. Also, it should be appreciated that not all of the steps described in the flow chart are required to be performed, that additional steps may be added, and that some of the illustrated steps may be substituted with other steps.

What is claimed is:

1. A method of enabling text input on a mobile electronic device, the method comprising:
   detecting an initial input of a textual object comprising a number of characters, each character being of a first character type, of a second character type, or of both the first and the second character types;
   storing, if it is determined that the characters are of the first character type, a first representation of the textual object from the initial input as a new entry in a first data source;
   storing, if it is determined that the characters are of the second character type, a second representation of the textual object from the initial input as a new entry in a second data source different from the first data source;
   storing, if it is determined that the characters are of both the first and the second character types, the first representation of the textual object in the first data source as a new entry and the second representation of the textual object in the second data source as a new entry;
   detecting a textual input in one of a first alphabet that can be transliterated into characters of at least the first character type and a second alphabet that can be transliterated into characters of at least the second character type; and
   outputting an identified first or second representation of the textual object as a proposed transliteration of the textual input.

2. The method of claim 1, further comprising:
   when the textual input is in the first alphabet, comparing the textual input with the first data source to identify the first representation of the textual object; and
   when the textual input is in the second alphabet, comparing the textual input with the second data source to identify the second representation of the textual object.

3. The method of claim 2, further comprising storing with at least one of the first representation of the textual object and the second representation of the textual object a representation of a string of characters which can be transliterated into the textual object.

4. The method of claim 2, further comprising:
   detecting as the textual input an incomplete input; and
   outputting the identified first or second representation of the textual object as both a proposed transliteration of the textual input and a proposed completion of the textual input.

5. A mobile electronic device comprising:
   a processor apparatus comprising a processor and a memory;
   an input apparatus structured to provide input to the processor apparatus;
   an output apparatus structured to receive output signals from the processor apparatus; and
   the memory having stored therein a number of routines which, when executed on the processor, cause the mobile electronic device to perform operations comprising:
   detecting an initial input of a textual object comprising a number of characters, each character being of a first character type, of a second character type, or of both the first and the second character types;
   storing, if it is determined that the characters are of the first character type, a first representation of the textual object from the initial input as a new entry in a first data source;
   storing, if it is determined that the characters are of the second character type, a second representation of the textual object from the initial input as a new entry in a second data source different from the first data source;
   storing, if it is determined that the characters are of both the first and the second character types, the first representation of the textual object in the first data source as a new entry and the second representation of the textual object in the second data source as a new entry;
   detecting a textual input in one of a first alphabet that can be transliterated into characters of at least the first character type and a second alphabet that can be transliterated into characters of at least the second character type; and
   outputting an identified first or second representation of the textual object as a proposed transliteration of the textual input.

6. The mobile electronic device of claim 5, wherein the operations further comprise:
   when the textual input is in the first alphabet, comparing the textual input with the first data source to identify the first representation of the textual object; and
   when the textual input is in the second alphabet, comparing the textual input with the second data source to identify the second representation of the textual object.

7. The mobile electronic device of claim 6, wherein the operations further comprise storing with at least one of the first representation of the textual object and the second representation of the textual object a representation of a string of characters which can be transliterated into the textual object.

8. The mobile electronic device of claim 6, wherein the operations further comprise:
   detecting as the textual input an incomplete input; and
   outputting the identified first or second representation of the textual object as both a proposed transliteration of the textual input and a proposed completion of the textual input.

9. A non-transitory machine-readable storage medium comprising instructions which, when executed on a mobile electronic device, cause the mobile electronic device to perform operations comprising:
   detecting an initial input of a textual object comprising a number of characters, each character being of a first character type, of a second character type, or of both the first and the second character types;
   storing, if it is determined that the characters are of the first character type, a first representation of the textual object from the initial input as a new entry in a first data source;
   storing, if it is determined that the characters are of the second character type, a second representation of the textual object from the initial input as a new entry in a second data source different from the first data source;
   storing, if it is determined that the characters are of both the first and second character types, the first representation of the textual object in the first data source as a new entry and the second representation of the textual object in the second data source as a new entry;
   detecting a textual input in one of a first alphabet that can be transliterated into characters of at least the first character type and a second alphabet that can be transliterated into characters of at least the second character type; and
   outputting an identified first or second representation of the textual object as a proposed transliteration of the textual input.

10. The machine-readable storage medium of claim 9, wherein the operations further comprise:
    when the textual input is in the first alphabet, comparing the textual input with the first data source to identify the first representation of the textual object; and when the textual input is in the second alphabet, comparing the textual input with the second data source to identify the second representation of the textual object.

11. The machine-readable storage medium of claim 10, wherein the operations further comprise storing with at least one of the first representation of the textual object and the second representation of the textual object a representation of a string of characters which can be transliterated into the textual object.

12. The machine-readable storage medium of claim 10, wherein the operations further comprise;
 detecting as the textual input an incomplete input; and
 outputting the identified first or second representation of the textual object as both a proposed transliteration of the textual input and a proposed completion of the textual input.

* * * * *